United States Patent [19]

Finnicum et al.

[11] Patent Number: 5,702,524
[45] Date of Patent: Dec. 30, 1997

[54] FLYWHEEL FOR COATING ROLLS

[75] Inventors: Douglas Scott Finnicum, Webster; Lawrence J. Finucane, Rochester; Jack Duane Peters, Rochester; Son Minh Le, Rochester, all of N.Y.

[73] Assignee: Eastman Kodak Company, Rochester, N.Y.

[21] Appl. No.: 621,369

[22] Filed: Mar. 25, 1996

Related U.S. Application Data

[63] Continuation of Ser. No. 255,033, Jun. 7, 1994, abandoned, which is a continuation-in-part of Ser. No. 16,345, Feb. 11, 1993, abandoned.

[51] Int. Cl.⁶ .................................................. F16F 15/10
[52] U.S. Cl. ................. 118/200; 74/574; 188/378; 118/258; 118/407; 118/410; 118/DIG. 2; 492/15; 492/16
[58] Field of Search ..................... 74/574; 188/378; 118/200, 258, 407, 410, DIG. 2; 492/15, 16

[56] References Cited

U.S. PATENT DOCUMENTS

| | | | |
|---|---|---|---|
| 2,041,555 | 5/1936 | Lee . | |
| 2,236,139 | 3/1941 | Hutchison, Jr. . | |
| 2,333,122 | 11/1943 | Prescott | 74/574 |
| 2,526,744 | 10/1950 | Hardy | 74/574 |
| 2,535,958 | 12/1950 | Sarazin | 74/574 |
| 2,580,435 | 1/1952 | Kirby . | |
| 2,761,791 | 9/1956 | Russell . | |
| 3,285,096 | 11/1966 | O'Connor | 74/574 |
| 4,392,681 | 7/1983 | Raquet | 74/574 |
| 4,825,983 | 5/1989 | Nakanishi | 74/574 |

FOREIGN PATENT DOCUMENTS

| | | | |
|---|---|---|---|
| 7219981 | 2/1973 | Germany . | |
| 2361956 | 6/1975 | Germany | 74/574 |
| 64-21244 | 1/1989 | Japan | 74/574 |
| 636881 | 5/1950 | United Kingdom | 74/574 |

*Primary Examiner*—John Hoffmann
*Attorney, Agent, or Firm*—Arthur H. Rosenstein

[57] ABSTRACT

The present invention is an improved flywheel for damping vibrations in a coating roll. The improved flywheel has an inner plate and an outer plate and sandwiched between the two plates are alternating rings of a solid body material such as aluminum or steel and conventional vibration damping material. Typically, the flywheel is attached to the coating roll outside of the bearing mounting block. The flywheel is designed such that movement of the inner and outer plates relative to each other works to compress the damping material sandwiched between the two plates. The plates are fastened together so that torsional motion between the plates, alternating rings, and coating roll is prevented. This compression of the damping material results in the absorption and dissipation of vibrational energy of the radial bending of the coating roll.

1 Claim, 16 Drawing Sheets

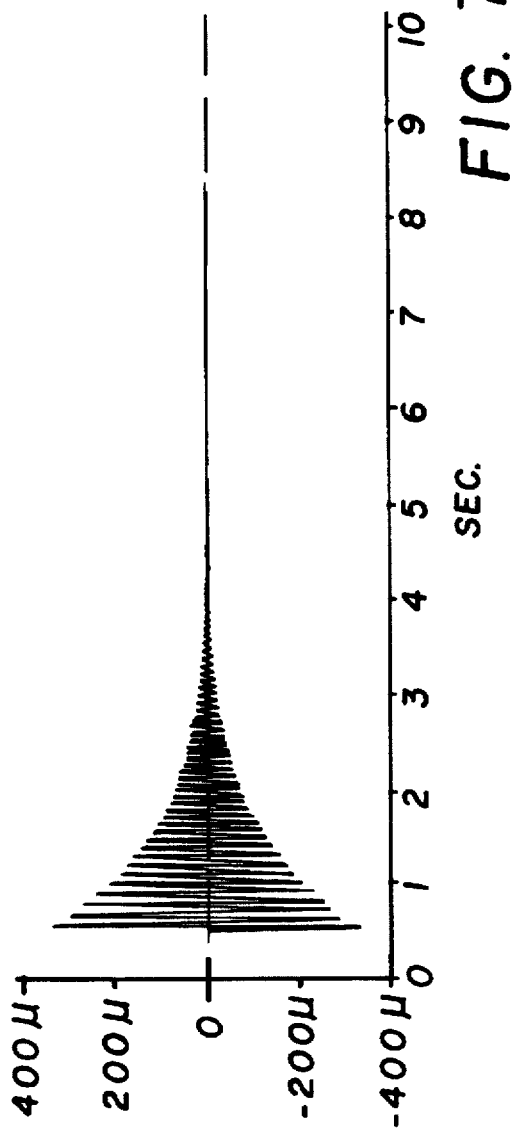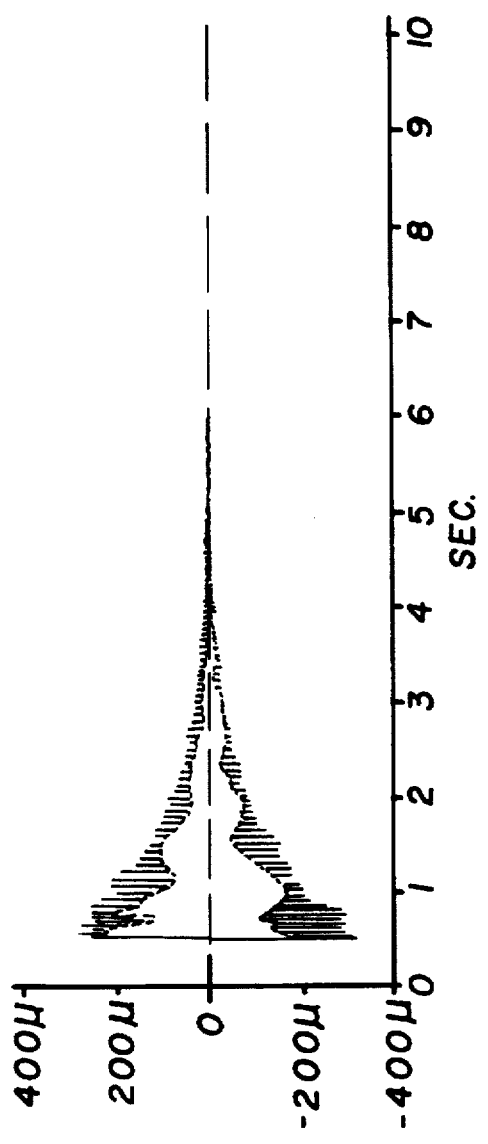

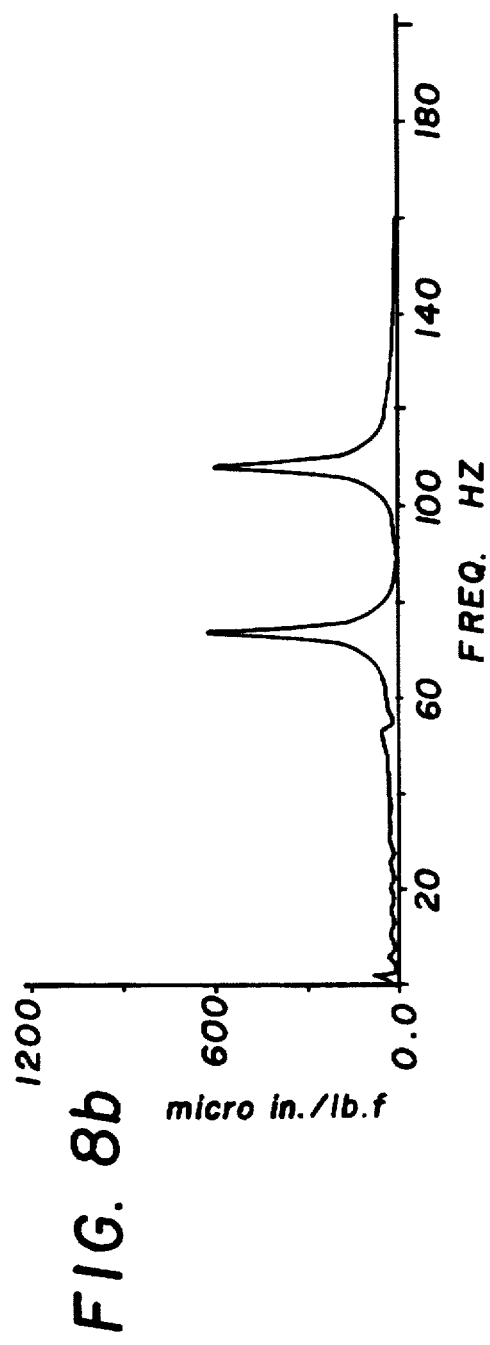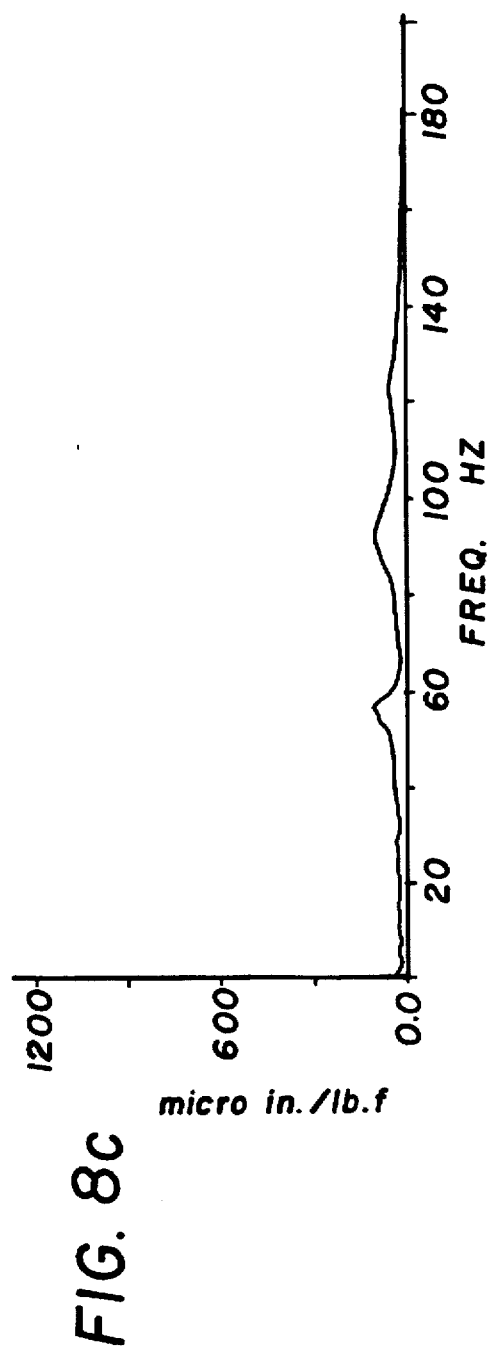
FIG. 8b
FIG. 8c

FLYWHEEL FOR COATING ROLLS

CROSS-REFERENCE TO RELATED APPLICATIONS

This is a Continuation of application Ser. No. 08/255,033, filed 7 Jun. 1994, now abandoned, which is a continuation-in-part of applicants application Ser. No. 08/016,345, filed Feb. 11, 1993 which application is now abandoned.

FIELD OF THE INVENTION

The present invention relates to an apparatus which damps natural radial vibrations of a rotary shaft.

BACKGROUND OF THE INVENTION

In the coating process known as bead coating and described in U.S. Pat. No. 2,761,791, multiple liquid layers flow down a slide hopper and are deposited on a moving web supported by a coating roll. In this process, the hopper lip is in close proximity to the moving web. In the space between the hopper lip and the web, a liquid bridge is formed. This liquid bridge is extremely sensitive to spacing changes. Radial vibration of the coating roll dynamically changes the spacing between the coating roll and the hopper lip. These spacing changes in turn cause nonuniform coatings to be made. The radial vibration of the coating roll is routinely detected in the uniformity of products coated using the bead coating process.

A flywheel attached to a coating roll has been found to provide assistance in maintaining a constant speed and a reduction in the radial vibration of the coating roll. It has also been shown that without a flywheel, a coating roll exhibits a single natural frequency mode. Installation of a standard flywheel creates two natural frequency modes which have lower amplitudes than the single natural frequency mode found without a flywheel. The addition of the flywheel does not increase the damping of the coating roll since the amplitude of the two smaller peaks is approximately equal to the amplitude of the single peak. It has also been shown that the relative heights of each peak can be adjusted by adding or removing weight to the flywheel, but their total amplitude always equals the amplitude of the single peak.

The present invention is a device which damps the vibrational radial energy of a coating roll using constrained layer damping techniques and thereby reduces the total vibrational radial amplitude of the coating roll.

SUMMARY OF THE INVENTION

The present invention is an apparatus for damping radial vibrations relative to an axis of symmetry of a stationary member in its stationary position. The apparatus includes a first plate element, a second plate element, and a means for fixing the first and second plate elements to the member at locations perpendicular to the axis of the member. Torsional movement between the member and the first and second plate elements about the axis is prevented. One layer of damping material is captured between and contacts each of the first and second plate elements. A means is provided for compressing a layer of damping material between the first and second plate elements of the apparatus whereby radial movement of the member relative to the axis of rotation of the member in its stationary position causes the plate elements of the apparatus to compress the layer of damping material through compression between the plate elements and layer of damping material to thereby damp the radial vibrations of the member.

In a preferred embodiment of the present invention one annular ring element is positioned between the first and second plate elements wherein one layer of the damping material is compressed between the first plate element and the annular ring element and one layer of damping material is compressed between the annular ring element and the second plate element.

BRIEF DESCRIPTION OF THE DRAWINGS

FIGS. 7(a)–(c) show the time response characteristics of a coating roller with; 7(a) no flywheel; 7(b) a prior art flywheel; and 7(c) a flywheel of the present invention.

FIGS. 8(a)–(c) show the frequency response characteristics of the coating roller with; 8(a) no flywheel; 8(b) a prior art flywheel; and 8(c) a flywheel of the present invention.

For a better understanding of the present invention, together with other and further advantages and capabilities thereof, reference is made to the following disclosure and appended claims in connection with the above-described drawings.

DETAILED DESCRIPTION OF THE PREFERRED EMBODIMENT

Figure 1:
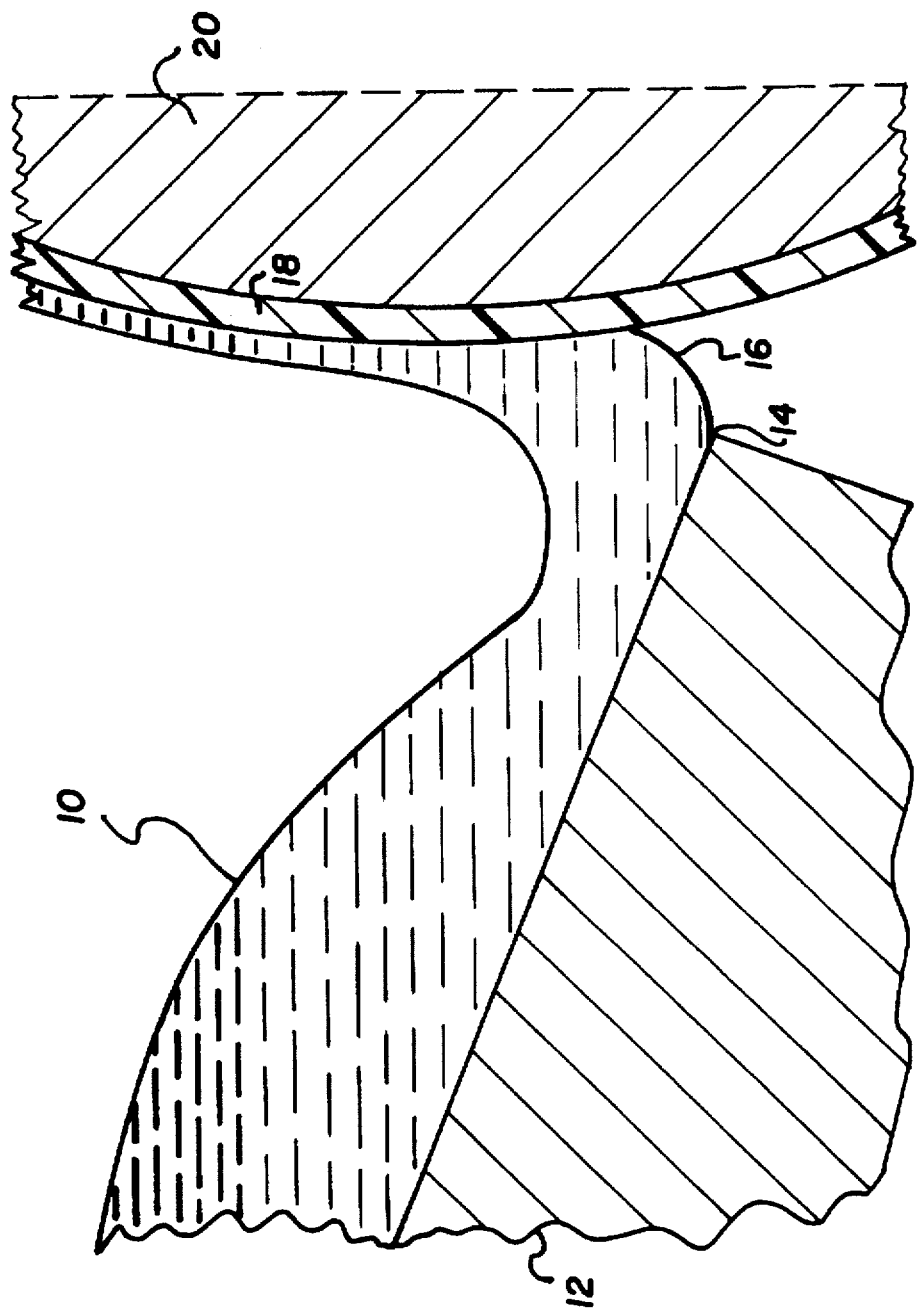
FIG. 1 shows a side view of a prior art bead coating zone.

A bead coating process is shown in FIG. 1. The coating liquid 10 flows down the slide hopper 12 to the hopper lip 14. The coating liquid 10 is deposited onto a moving web 18 supported by a coating roller 20. A liquid bridge 16 is formed between the hopper lip 14 and the moving web 18. It is this liquid bridge 16 that makes bead coating so sensitive to spacing changes. A 4% coating thickness variation is expected for every 0.001 inch spacing variation. Typically, the space between the hopper lip 14 and the web 18 is from approximately 0.005 inches to about 0.020 inches. Due to the close proximity around the coating bead or liquid bridge 16, the spacing between the hopper lip 14 and the moving web 18 cannot be monitored dynamically while coating a product. However, it has been shown that hopper lip 14 spacing changes with the web 18 produce fluctuations in the coated product which can be monitored.

Shown in FIG. 1 is a coating roller 20. For purposes of the present invention a coating roller has the following characteristics; a diameter of about 2 inches to about 10 inches; a weight of about 60 to about 300 pounds; and at a length of about 20 inches to about 100 inches. Although the flywheel of the present invention is described using a coating roller, the flywheel will work to dampen radial vibrations from any rotating member.

Figure 2:
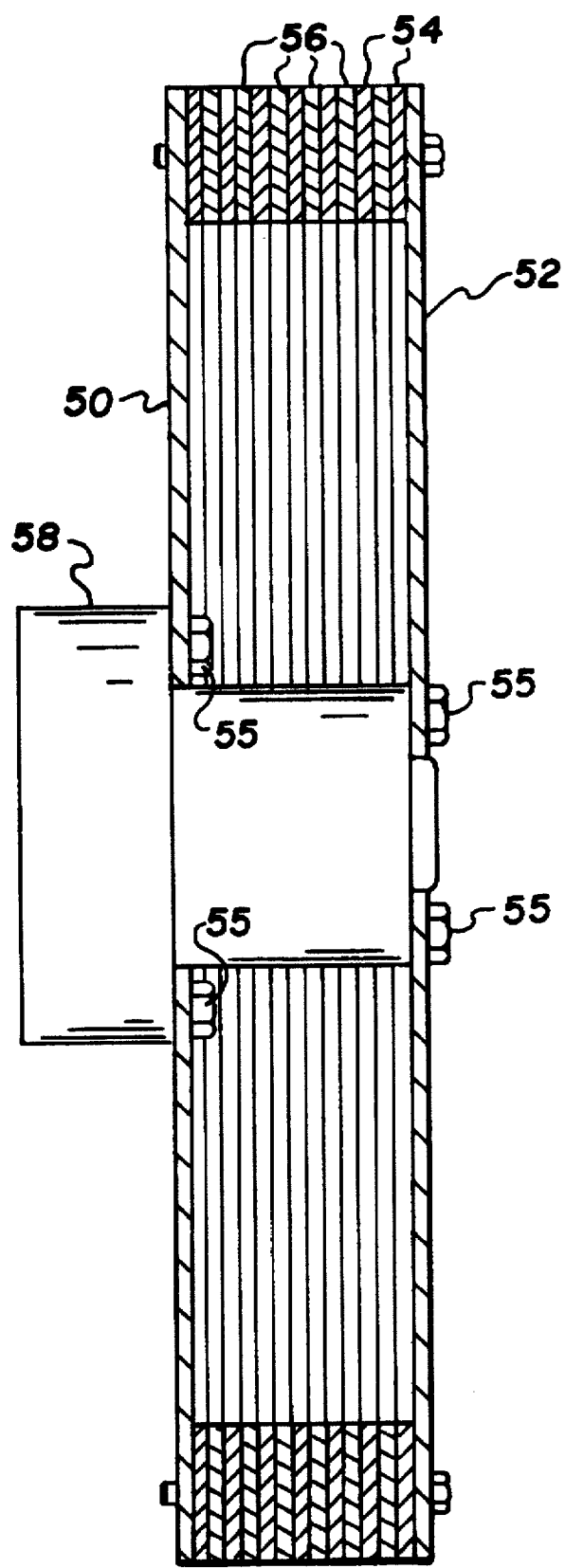
FIG. 2 shows a cross-sectional view of the flywheel of the present invention.
Figure 3:
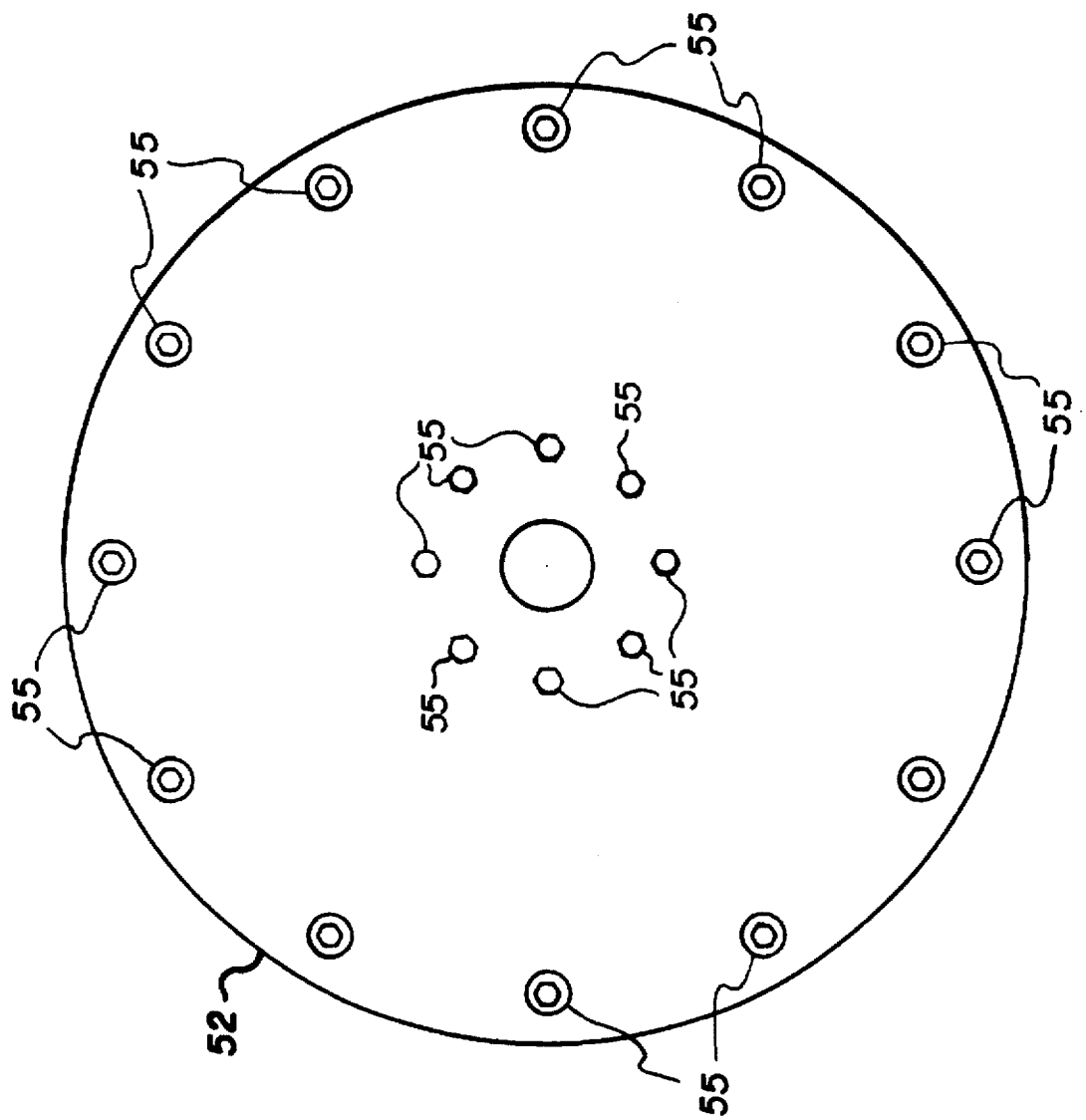
FIG. 3 shows a side view of the flywheel of the present invention.

Shown in FIGS. 2 and 3 are a cross-sectional view and a side view of the flywheel of the present invention. The flywheel includes an inner plate 50, and outer plate 52 and sandwiched between the two plates 50 and 52, are alternating rings 56 of conventional hard body material and rings 54 of conventional vibration damping material. The flywheel is attached to the coating roll outside the bearing mounting block by collar 58. The structure of the flywheel is designed such that the radial bending of the coating roll creates movement of the inner 50 and outer 52 plates relative to each other works to compress the damping material 54 sandwiched between the alternating rings 56 of hard body material and the two plates 50 and 52. This compression of the damping material with the plates results in the absorption and dissipation of radial mode vibrational energy of the coating roll. Thus, vibrational energy of the coating roll caused by radial bending creates movement between the two plates 50 and 52, and is absorbed and dissipated with damping material 54. The net effect of using this damped flywheel is to reduce the vibrations of the coating roll. The radial vibration of the coating roll is dampened because plates 50 and 52, alternating rings 56 of hard body material and ring 54 of conventional vibration damping material are prevented from moving in the torsional direction by fasteners 55. This leads to more uniform coating since the variation of the spacing between the coating roll and the coating lip is decreased.

As shown in FIGS. 2 and 3, the inner plate 50, outer plate 52 and alternating rings 56, 54 of hard body material and vibration damping material, are held together by fasteners 55. The fasteners can be bolts and nuts, rivets, or any other suitable means. The fasteners prevent torsional movement between the plates 50, 52 and alternating rings 56, 54 of hard body material and vibration damping material. The plates and rings of material do move as the coating roll bends radially causing the whole flywheel to compress. The compression of the damping material produces heat which dissipates the vibration of the coating roll. If there were no damping material, the energy absorbed by the flywheel from the coating roll would be delivered back to the coating roll.

The flywheel plates 50, 52 and alternating rings 56 can be manufactured from any solid body material such as metal or plastic. The preferred material for the plates and alternating rings is stainless steel or aluminum. The damping material can be any vibration damping material. The preferred material, available from E.A.R. Division of Cabot Corporation, is a viscoelastic polymer. The damping material used in the flywheels was ISODAMP® C-1002-25.

Figure 4:
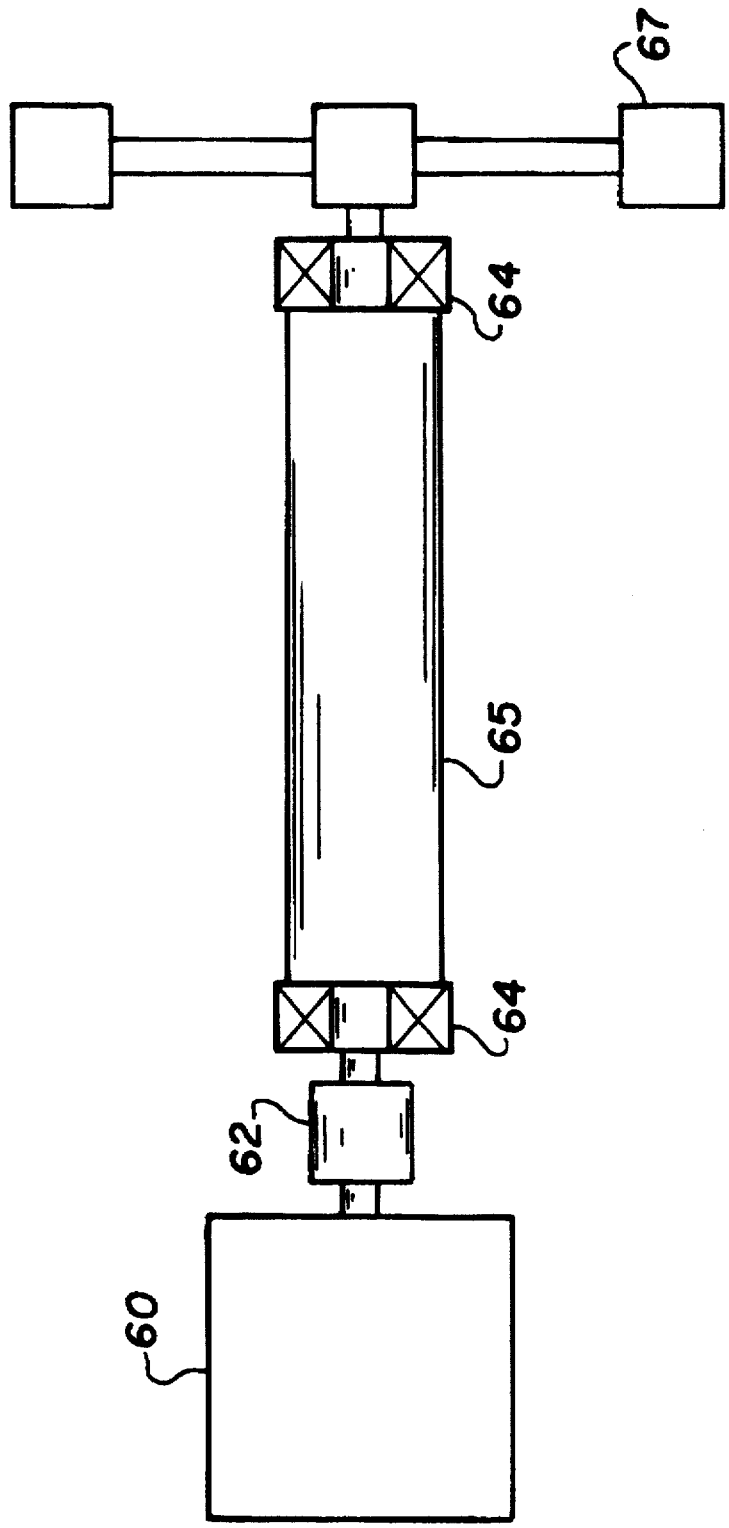
FIG. 4 shows a schematic of a coating roller including a prior art flywheel.
Figure 5:
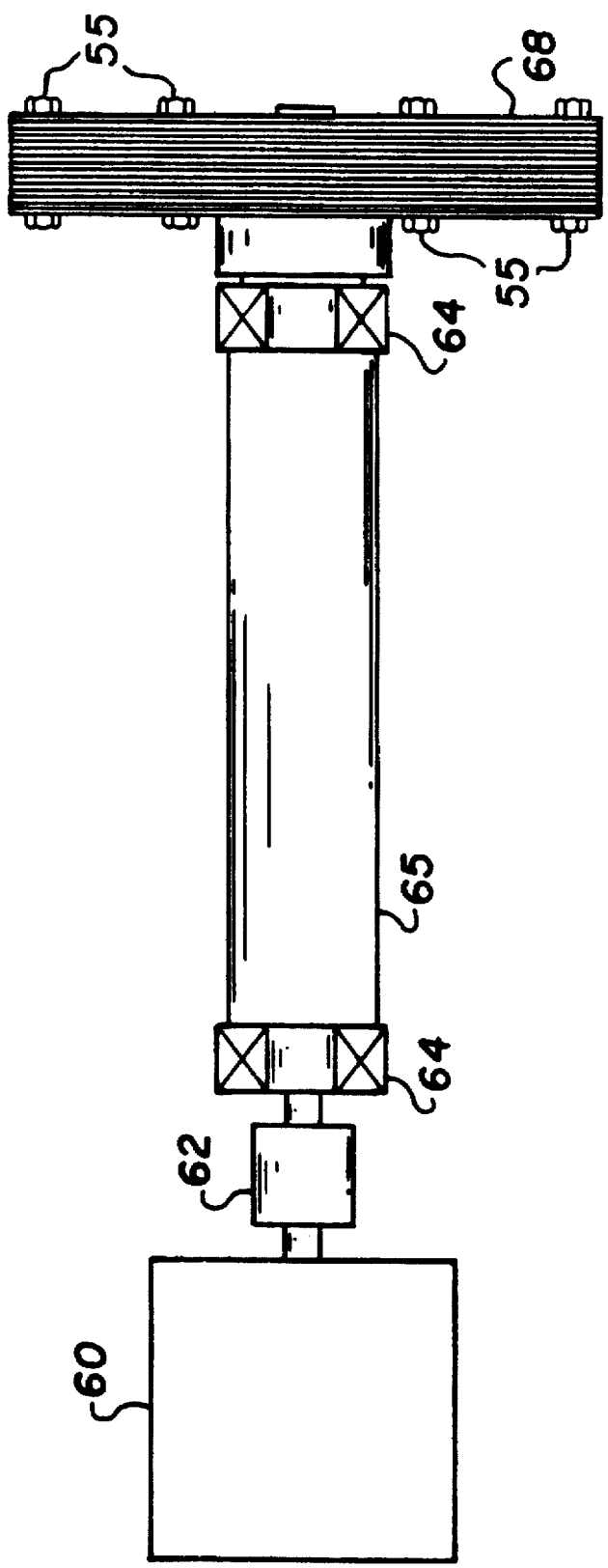
FIG. 5 shows a schematic of a coating roller including a flywheel of the present invention.
Figure 6A:
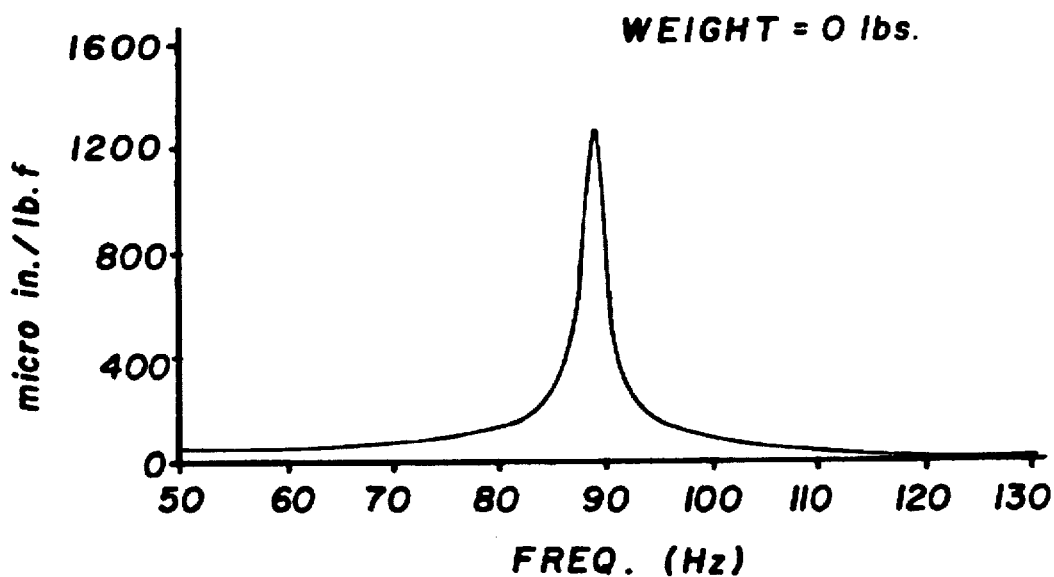
FIGS. 6(a)–(d) show the frequency response of a coating roller with; 6(a) no flywheel; 6(b) a 72 pound prior art flywheel; 6(c) a 120 pound prior art flywheel; and 6(d) with a 160 pound prior art flywheel.
Figure 6B:
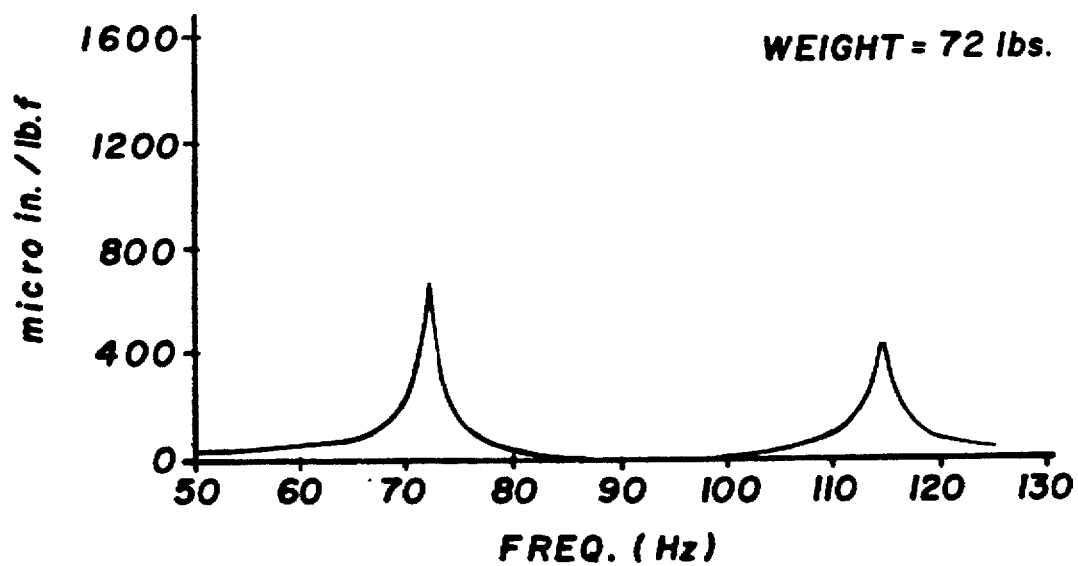
Figure 6C:
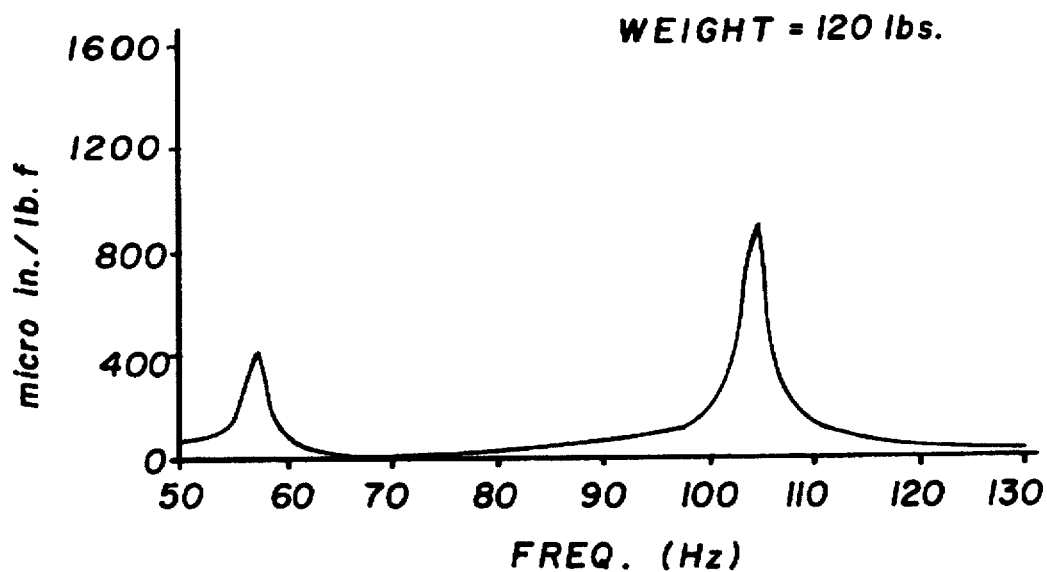
Figure 6D:
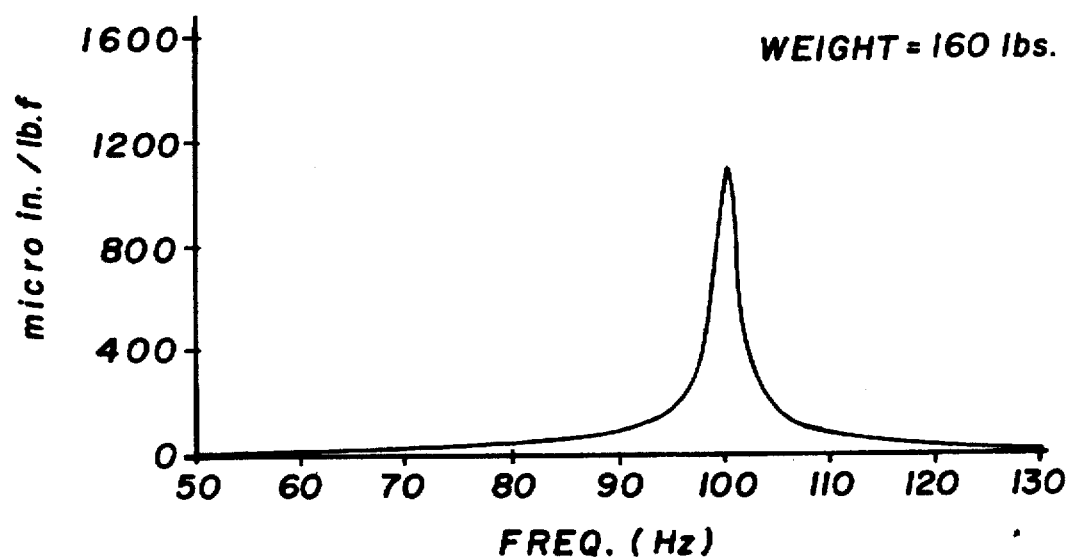

The following experiments were run on the flywheel of the present invention and compared with data obtained from prior art flywheels. The flywheel of the present invention ranged in diameter from 10 inches to 40 inches. The approximate weight was 100 pounds. The number of alternating rings of hard body material (aluminum) and damping material (ISODAMP® C-1002-25) varied from 7 to 13 although one layer of damping material will provide some vibrational damping. The results show that the flywheel of the present invention reduces radial mode vibrational energy and thereby damps the coating roll. The experimental set up is shown in FIGS. 4 and 5. A coating roller motor 60 attached to a flexible coupling 62 couples the coating roller motor 60 to the coating roller 65. The coating roller is supported by ball bearing supports 64 at each end. FIG. 4 shows the prior art flywheel 67 attached to the coating roller outside one of the ball bearing supports 64. FIG. 5 shows the flywheel 68 of the present invention attached to the coating roller 65 outside one of the ball bearing supports 64.

A Bruel and Kjaer 8202 Impact Hammer was used as the source of force for excitation on the coating roller. The hammer was coupled to a Bruel and Kjaer type 2626 Conditioning Amplifier. Sensitivity was determined to be 4.45 milli-volts for each pound of input force. Response of the coating roller was measured with an Accumeasure 1000 non-contact displacement system manufactured by Mechanical Technology, Inc. The Accumeasure system included an AS-1021-PA amplifier coupled to an ASP-10-CTA capacitance probe. The sensitivity was determined to be 1000 volts for each inch of movement. Total movement range was limited to 0.01 inches based on the capabilities of the capacitance probe. Data was collected and analyzed using a Hewlett-Packard 3562A Dynamic Signal Analyzer. Static bump tests were performed on the roll module with the flywheels attached. From the input force and output response measurements, frequency response and coherence were calculated using the HP 3562A DSA.

A series of tests were run on prior art flywheels with the flywheel weights varied from 0 to 162 pounds. The prior art flywheel was of perimeter mass design and constructed from steel. The standard prior art flywheel weighed 102 pounds and this weight was varied using attachable steel plates as the perimeter mass. The hammer test results for four weights is shown in FIG. 6 (a)–(d) for the frequency range of 50–130 Hz. At 0 pounds i.e. no flywheel, the frequency response of the coating roll contains only one peak at 88 Hz. However, as weight was added to the flywheel, a second natural appeared in the frequency range of interest. In addition as the weight increased in the flywheel, the amplitude of the second natural rose at the expense of the first till at the highest weight studied of 160 pounds only the second natural is observed.

Figure 7C:
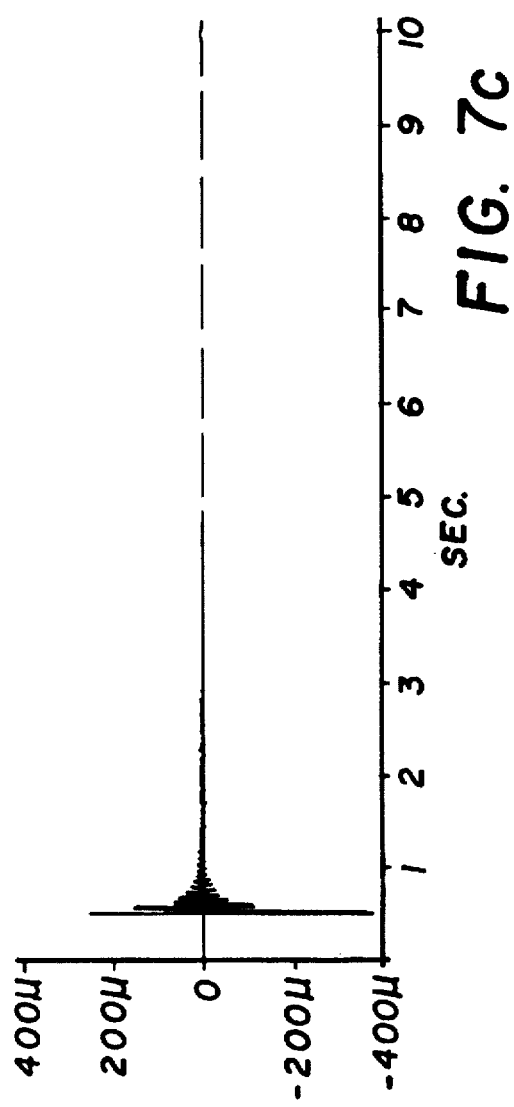
Figure 8A:
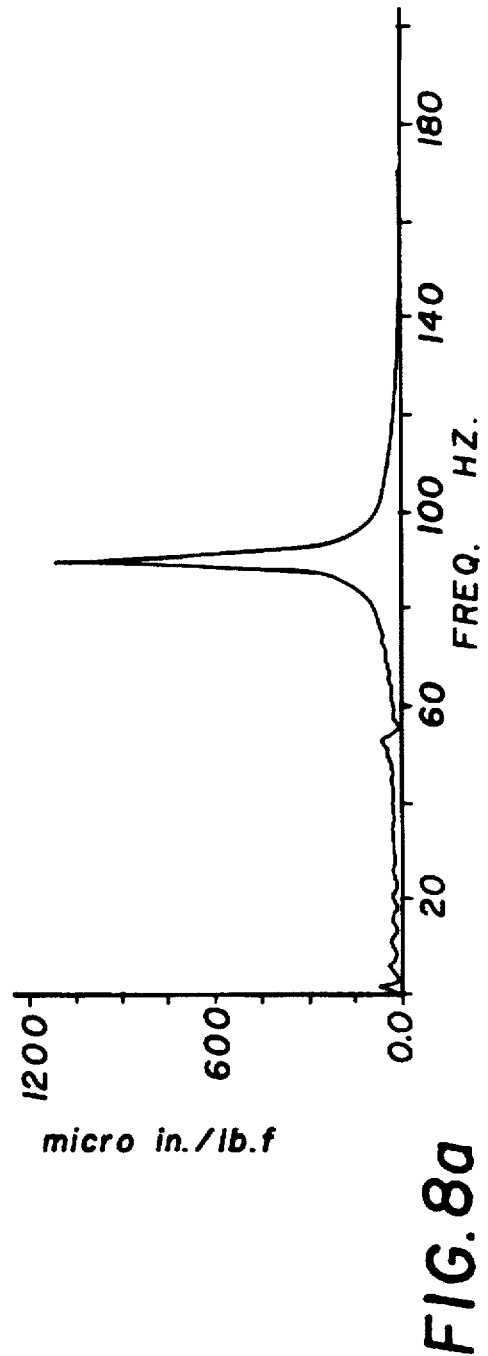

When tests were run on the flywheel of the present invention as shown in FIGS. 2 and 3, wherein the flywheel included viscoelastic rings sandwiched between anodized aluminum rings and capture plates, the following results were observed. FIGS. 7(a)–(c) show the time response characteristics of the coating roller. FIG. 7(a) shows the response when the coating roller has no flywheel, 7(b) shows the response with a 102 lb. prior art flywheel and 7(c) shows the response with a flywheel of the present invention. FIGS. 7(a)–(c) show the movement of the coating roll in microinches as a function of time. The responses of FIGS. 7(a)–(c) were transformed by the equipment previously mentioned to yield the frequency response shown in FIGS. 8(a)–(c).

Graph 8(a) shows a frequency response of a coating roller with no flywheel attached. Graph 8(b) shows a frequency response of the coating roller with a prior art steel flywheel of 102 pounds attached. It shows two frequency modes at 75.2 Hz with an amplitude of 600 microinches per pound force and at 108.75 Hz with an amplitude of 585 microinches per pound force. Finally, graph 8(c) is a frequency response of the coating roller module with the flywheel of the present invention. It has three frequency modes of 56.75 Hz with an amplitude of 160 microinches per pound force, 92 Hz with an amplitude of 104 microinches per pound force, and at 119 Hz with an amplitude of 51 microinches per pound force. Although there is an additional mode there is a reduction in amplitude of approximately 6 to 1 over the old style flywheel.

Figure 9:
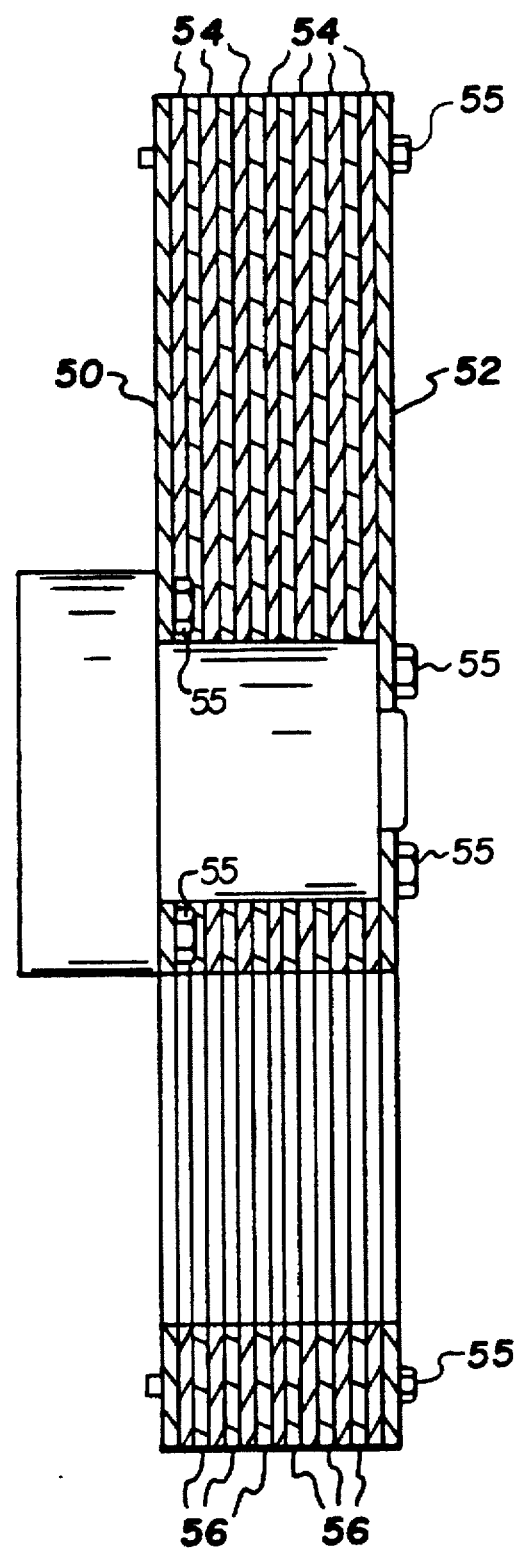
FIG. 9 shows a cross-sectional view of an alternate embodiment of a flywheel of the present invention.
Figure 10:
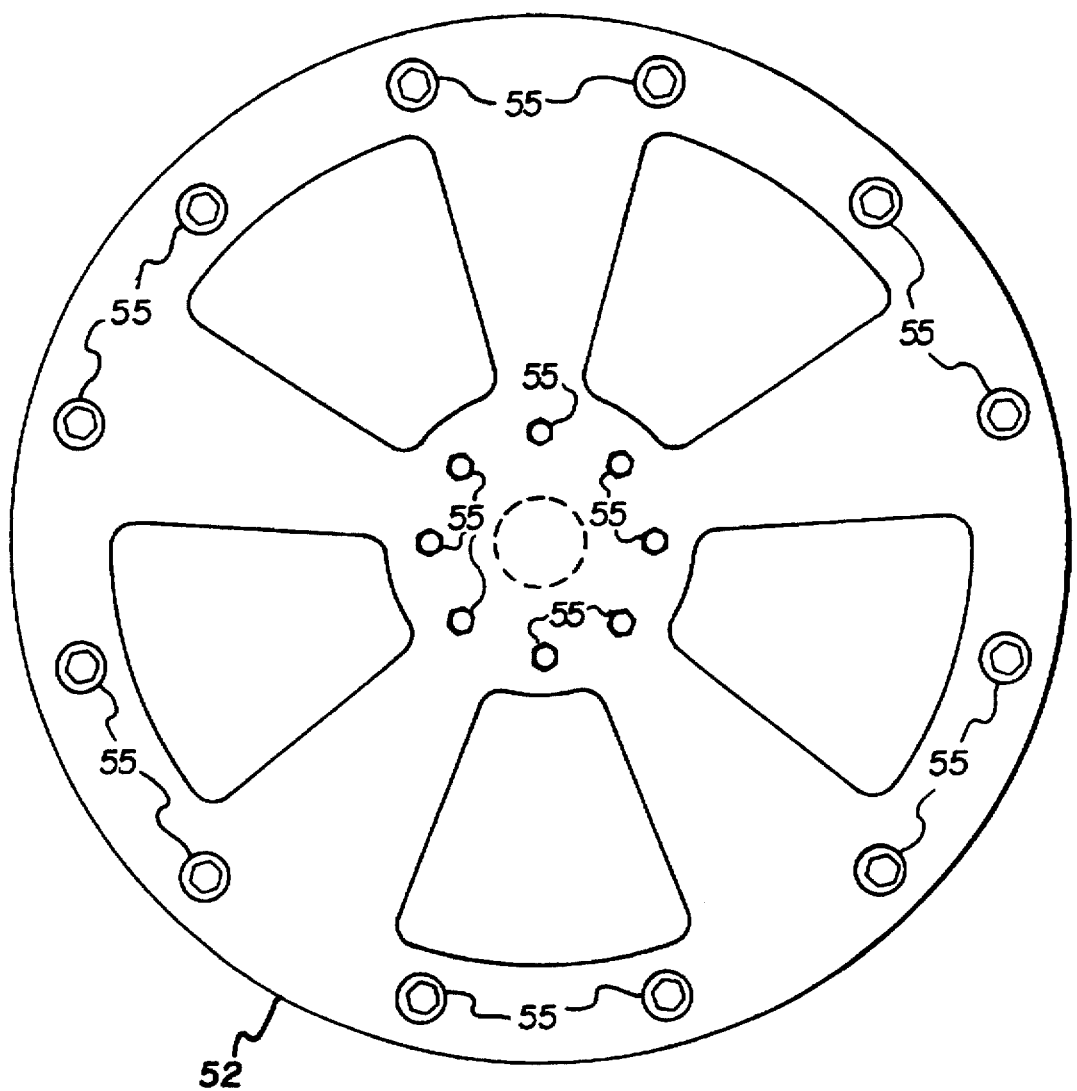
FIG. 10 shows a side view of an alternate embodiment of the flywheel of the present invention.
Figure 11:
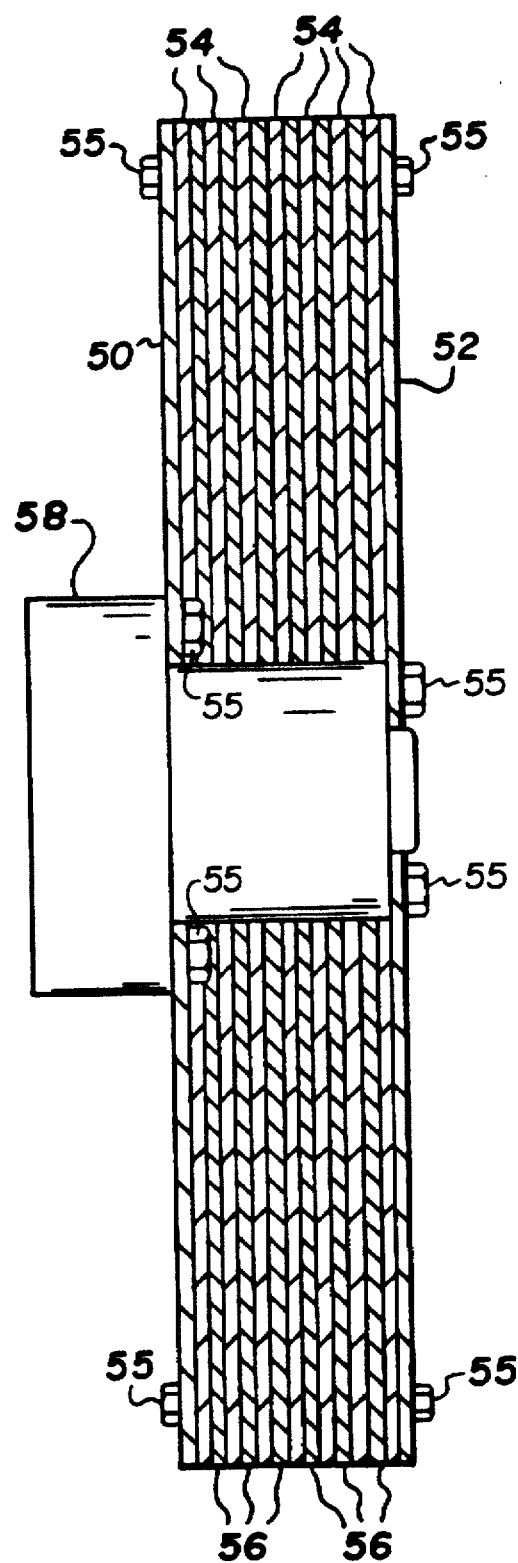
FIG. 11 shows a cross-sectional view of an alternate embodiment of a flywheel of the present invention.
Figure 12:
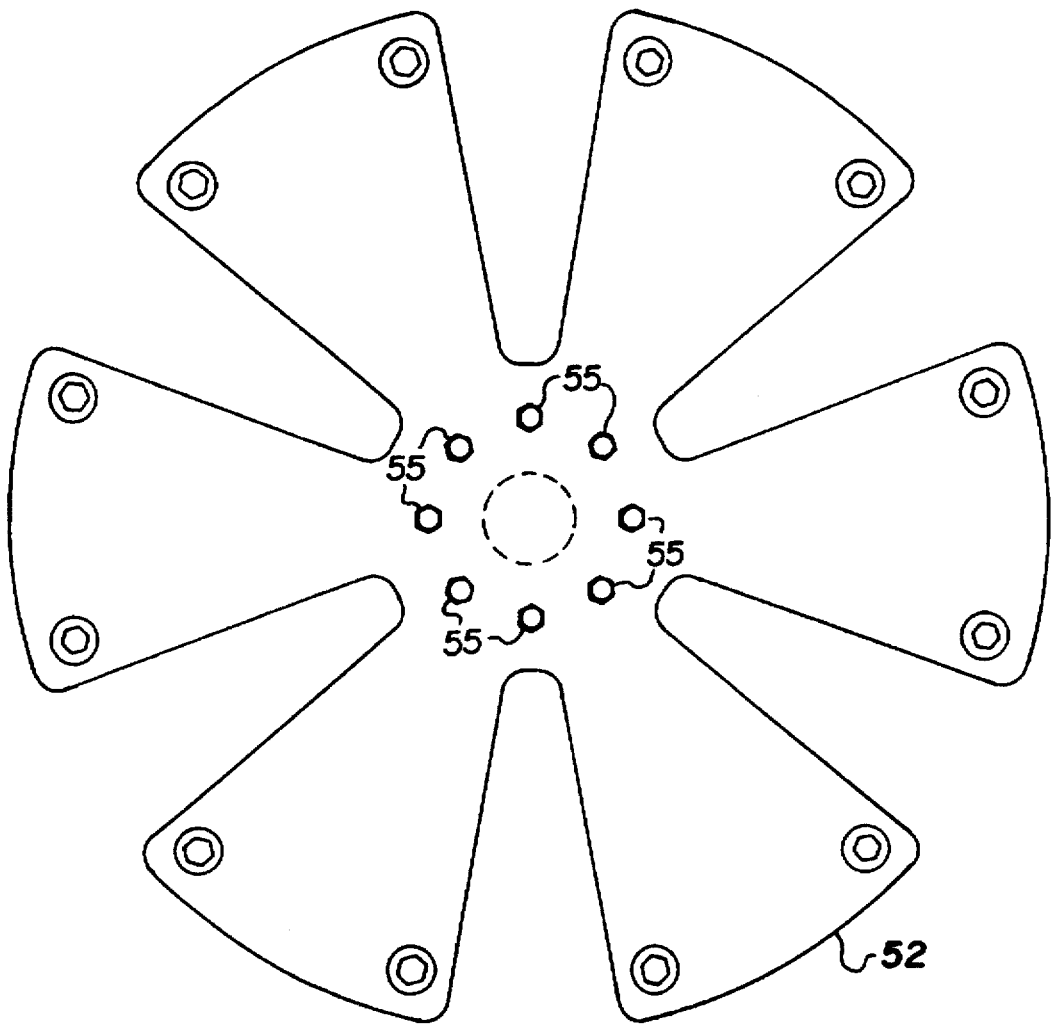
FIG. 12 shows a side view of an alternate embodiment of a flywheel of the present invention.
Figure 13:
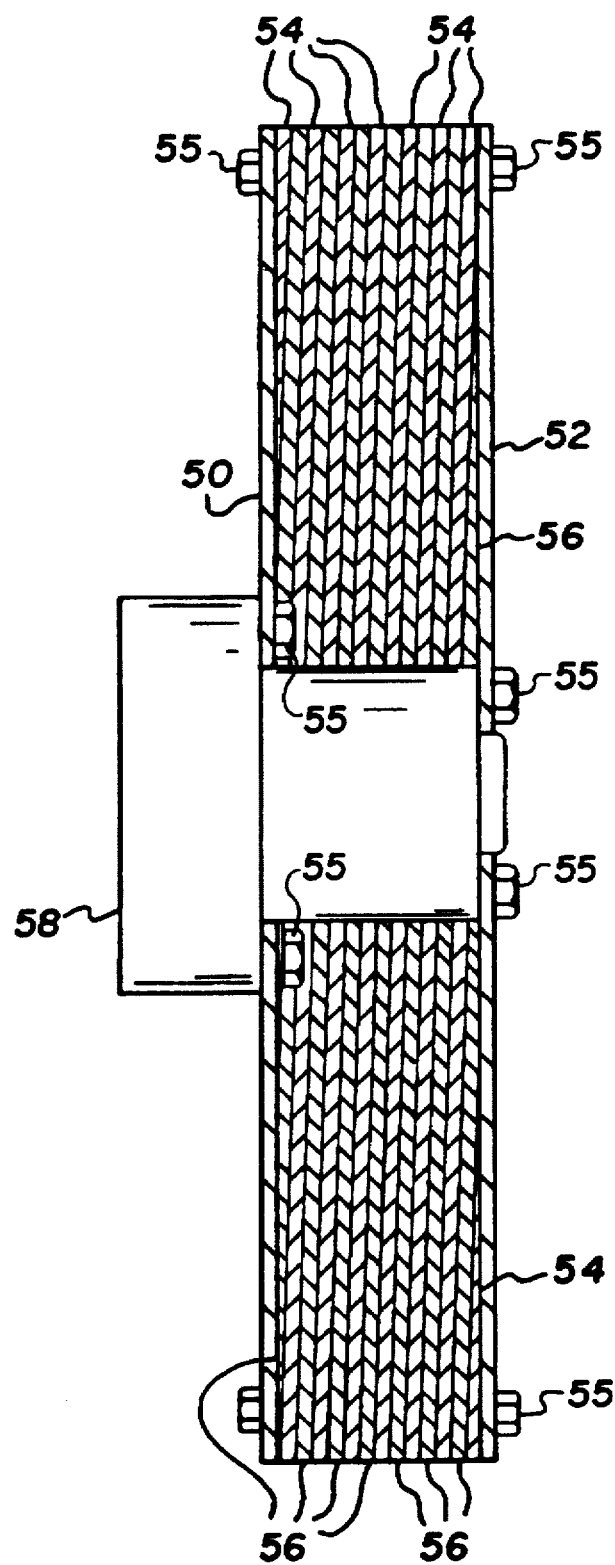
FIG. 13 shows a cross-sectional view of an alternate embodiment of the flywheel of the present invention.
Figure 14:
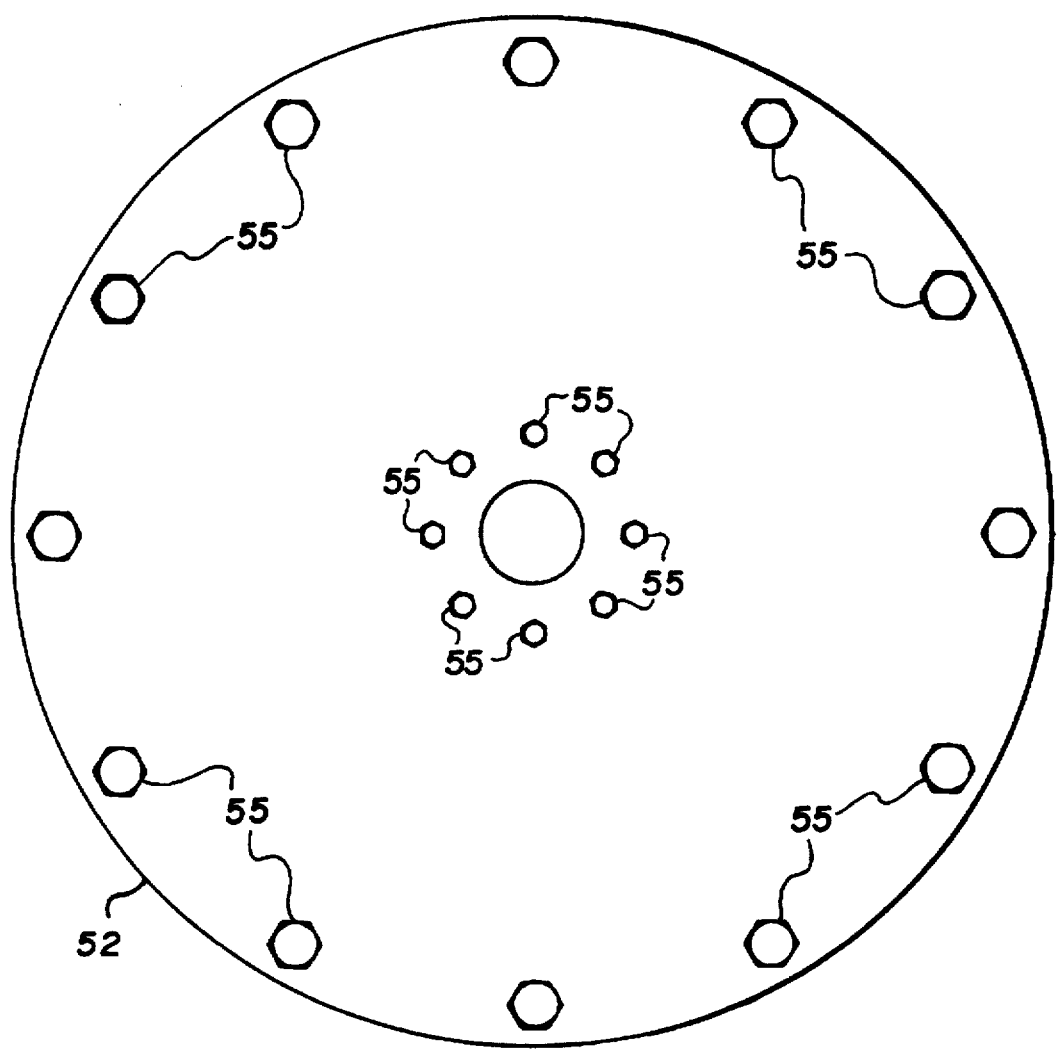
FIG. 14 shows a side view of an alternate embodiment of the flywheel of the present invention.

FIGS. 9 and 10 show an alternate design of the flywheel of the present invention. In this embodiment, the plates used are of a different shape than that shown in FIG. 3. Likewise, FIGS. 11 and 12 show another design of the flywheel of the present invention. FIGS. 13 and 14 show yet another design of the flywheel of the present invention. In this embodiment the damping material 54 and ring 56 are constructed in a spiral. In all these embodiments, fasteners 55 are provided to prevent torsional motion between the plates and the alternating flags.

While there has been shown what are presently considered to be the preferred embodiments of the invention various modifications and alterations will be obvious to those skilled in the art. All such modifications are intended to fall within the scope of the appended claims.

What is claimed is:

1. A coating roll assembly comprising:
   a motor coupled to a coating roll for rotating the coating roll around an axis;
   a flywheel for damping radial vibrations of the coating roll relative to the axis of rotation of said coating roll comprising;
   a first planar plate element;
   a second planar plate element;
   planar layer of damping material;
   fasteners to prevent torsional motion;
   means for fixing said plate elements to said coating roll perpendicular to said axis of said coating roll and for preventing torsional movement between the coating roll, said plate elements, and said damping material around the rotating axis with said fasteners;
   said planar layer of damping material captured between and contacting each of said planar plate elements wherein torsional movement between said first planar plate element, said second planar plate element and said planar layer of damping material is prevented by said fasteners;
   whereby radial movement of said coating roll relative to the axis of rotation of said coating roll causes said plate elements to compress said layer of damping material to damp said vibrations by means of compression between said plate elements and said layer of damping material.

* * * * *